United States Patent
Huang et al.

(10) Patent No.: US 9,927,918 B2
(45) Date of Patent: Mar. 27, 2018

(54) TOUCH DISPLAY SUBSTRATE, ELECTRONIC DEVICE AND DRIVING METHOD

(71) Applicants: Shanghai Tianma Micro-Electronics Co., Ltd., Shanghai (CN); Tianma Micro-Electronics Co., Ltd., Shenzhen (CN)

(72) Inventors: Zhongshou Huang, Shanghai (CN); Zhaokeng Cao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 29 days.

(21) Appl. No.: 14/952,531

(22) Filed: Nov. 25, 2015

(65) Prior Publication Data

US 2017/0046003 A1    Feb. 16, 2017

(30) Foreign Application Priority Data

Aug. 10, 2015    (CN) .......................... 2015 1 0486244

(51) Int. Cl.
*G06F 3/041*    (2006.01)
*G06F 3/044*    (2006.01)

(52) U.S. Cl.
CPC ............ *G06F 3/0418* (2013.01); *G06F 3/044* (2013.01); *G06F 2203/04103* (2013.01)

(58) Field of Classification Search
CPC ............................... G06F 3/044; G06F 3/0416

(Continued)

(56) References Cited

U.S. PATENT DOCUMENTS

| 9,024,913 B1* | 5/2015 | Jung ....................... G06F 3/044 178/18.06 |
| 2013/0215075 A1* | 8/2013 | Lee ......................... G06F 3/044 345/174 |

(Continued)

FOREIGN PATENT DOCUMENTS

| CN | 104267862 A | 1/2015 |
| CN | 104503633 A | 4/2015 |

(Continued)

OTHER PUBLICATIONS

Chinese Application No. 201510486244.X, First Office Action dated Jul. 20, 2017.

*Primary Examiner* — Yuzhen Shen
(74) *Attorney, Agent, or Firm* — Alston & Bird LLP

(57) ABSTRACT

Provided is a touch display substrate, an electronic device and a driving method. The touch display substrate includes a substrate, and a common electrode layer and a wire layer arranged on a same side of the substrate. The common electrode layer includes multiple common electrodes. The wire layer includes multiple wires connected to the common electrodes respectively. The wire includes a first connection portion and a second connection portion. The common electrode is connected to a control circuit with the first connection portion and the second connection portion. A first end of the first connection portion is connected to the common electrode and a second end of the first connection portion is connected to a first end of the second connection portion. The second connection portion is parallel to a column direction of an array. The second end of the second connection portion is connected to the control circuit.

17 Claims, 6 Drawing Sheets

(58) Field of Classification Search
USPC .......................................................... 345/173
See application file for complete search history.

(56) References Cited

U.S. PATENT DOCUMENTS

| | | | |
|---|---|---|---|
| 2014/0111466 A1* | 4/2014 | Kim ........................ | G06F 3/044 345/174 |
| 2014/0368750 A1* | 12/2014 | Liao ........................ | G06F 3/044 349/12 |
| 2016/0291784 A1 | 10/2016 | Zhai | |
| 2016/0299385 A1 | 10/2016 | Park et al. | |
| 2016/0306457 A1* | 10/2016 | Ding ........................ | G06F 3/044 |
| 2016/0349889 A1 | 12/2016 | Yang et al. | |
| 2016/0357333 A1* | 12/2016 | Huang ..................... | G06F 3/044 |
| 2016/0364060 A1 | 12/2016 | Wang et al. | |

FOREIGN PATENT DOCUMENTS

| | | |
|---|---|---|
| CN | 104699315 A | 6/2015 |
| CN | 104793827 A | 7/2015 |

* cited by examiner

TOUCH DISPLAY SUBSTRATE, ELECTRONIC DEVICE AND DRIVING METHOD

CROSS REFERENCE OF RELATED APPLICATION

The present application claims the priority to Chinese Patent Application No. 201510486244.X, titled "TOUCH DISPLAY SUBSTRATE, ELECTRONIC DEVICE AND DRIVING METHOD", filed on Aug. 10, 2015 with the State Intellectual Property Office of the People's Republic of China, the content of which is incorporated herein by reference in its entirety.

FIELD

The present disclosure relates to the technical field of touch display, in particular, to a touch display substrate, an electronic device and a driving method.

BACKGROUND

At the initial stage of development of the touch display technology, a touch display panel is formed by a combination of a touch panel and a display panel to achieve a touch display function. In this case, the touch panel and the display panel are fabricated independently, resulting in high cost, substantial thickness and low production efficiency.

With the development of self-contained touch display technology, a common electrode of an array substrate of the display panel may also be used as a touch sensing electrode for a self-contained touch detection, and both the touch function and the display function may be achieved by performing touch control and display control in a time-sharing driving manner. In this case, the touch sensing electrode is integrated in the display panel directly, thereby reducing the fabrication cost and the thickness of the panel and improving the production efficiency.

FIG. 1 is a schematic structural diagram of a general touch display substrate according to conventional technologies. The touch display substrate includes a common electrode layer and a wire layer arranged opposite to each other on a substrate. The common electrode layer includes multiple common electrodes 11 arranged in an array. The wire layer includes multiple wires 12 connected to the common electrodes 11 in a one-to-one way. An insulation layer is arranged between an end of the wire 12 and the common electrode 11. The end of the wire 12 is connected to the common electrode 11 through a via hole 13, and the other end of the wire 12 is connected to a control circuit 14.

As can be seen in FIG. 1, in a column of common electrodes 11 of the conventional touch display substrate, a wire 12 connected to a common electrode 11 at a distal end of the column (an end of the column far away from the control circuit 14) is connected to a touch detection amplifier 14 in a way of striding over other common electrodes 11 in the same column. In this case, a touch detection signal transmitted in the wire 12 may be coupled to other common electrodes in the same column via parasitic capacitances, thereby resulting in serious vertical crosstalk and affecting the accuracy of the touch detection.

BRIEF SUMMARY OF THE INVENTION

To address the above issues, the present disclosure provides a touch display substrate, an electronic device and a driving method, to avoid vertical crosstalk and ensure the accuracy of touch detection.

In order to achieve the above object, technical solutions are provided according to the present disclosure.

A touch display substrate includes: a substrate, a common electrode layer and a wire layer, where the common electrode layer and the wire layer are arranged on the same side of the substrate. The common electrode layer and the wire layer are arranged separately. The common electrode layer includes multiple common electrodes arranged spaced apart from one another, the common electrodes are arranged in an array of M rows×N columns and the common electrodes serve as touch electrodes, where M and N are positive integers. The wire layer includes multiple wires respectively connected to the common electrodes. Each of the wires includes a first connection portion and a second connection portion. The common electrode is electrically connected to a control circuit with the first connection portion and the second portion. A first end of the first connection portion is connected to the common electrode and a second end of the first connection portion is connected to a first end of the second connection portion. Among M wires connected to common electrodes in the same column of the array, second ends of first connection portions of wires connected to common electrodes in odd rows and second ends of first connection portions of wires connected to common electrodes in even rows are arranged on two sides of the column of common electrodes. The second connection portion is parallel to a column direction of the array and is not overlapped with common electrodes in the same column as the common electrode electrically connected to the second connection portion. A second end of the second connection portion is connected to the control circuit.

In the touch display substrate, the second ends of the first connection portions of the wires connected to the common electrodes in the odd rows and the second ends of the first connection portions of the wires connected to the common electrodes in the even rows are arranged on two sides of the column of the common electrodes, that is, the second ends of the first connection portions of the wires connected to the common electrodes in the odd rows are arranged on one side of the column of the common electrodes and the second ends of the first connection portions of the wires connected to the common electrodes in the even rows are arranged on the other side of the column of the common electrodes. In this case, wires connected to common electrodes in any column are arranged on two sides of the column, thereby avoiding vertical crosstalk and ensuring the accuracy of touch detection.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION

The technical solutions according to the embodiments of the present disclosure are described clearly and completely in conjunction with the drawings hereinafter. It is apparent that the described embodiments are only a few rather than all of the embodiments according to the present disclosure. Any other embodiments obtained by those skilled in the art based on the embodiments in the present disclosure without any creative work fall into the scope of the present disclosure.

Figure 1:
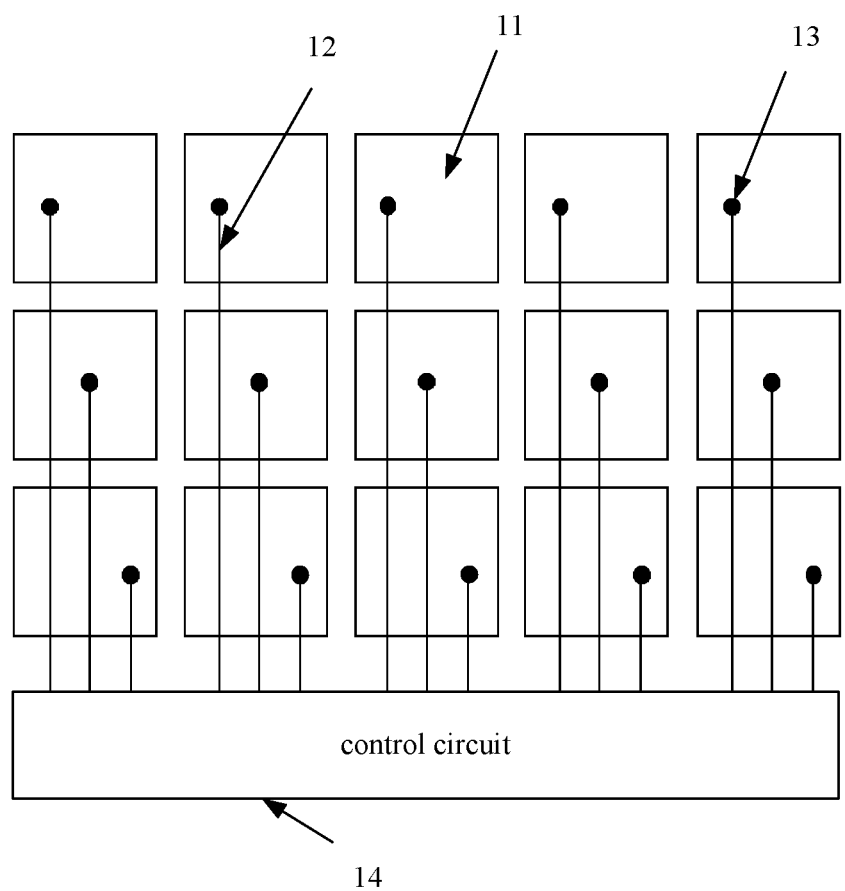
FIG. 1 is a schematic structural diagram of a general touch display substrate according to conventional technologies.
Figure 2:
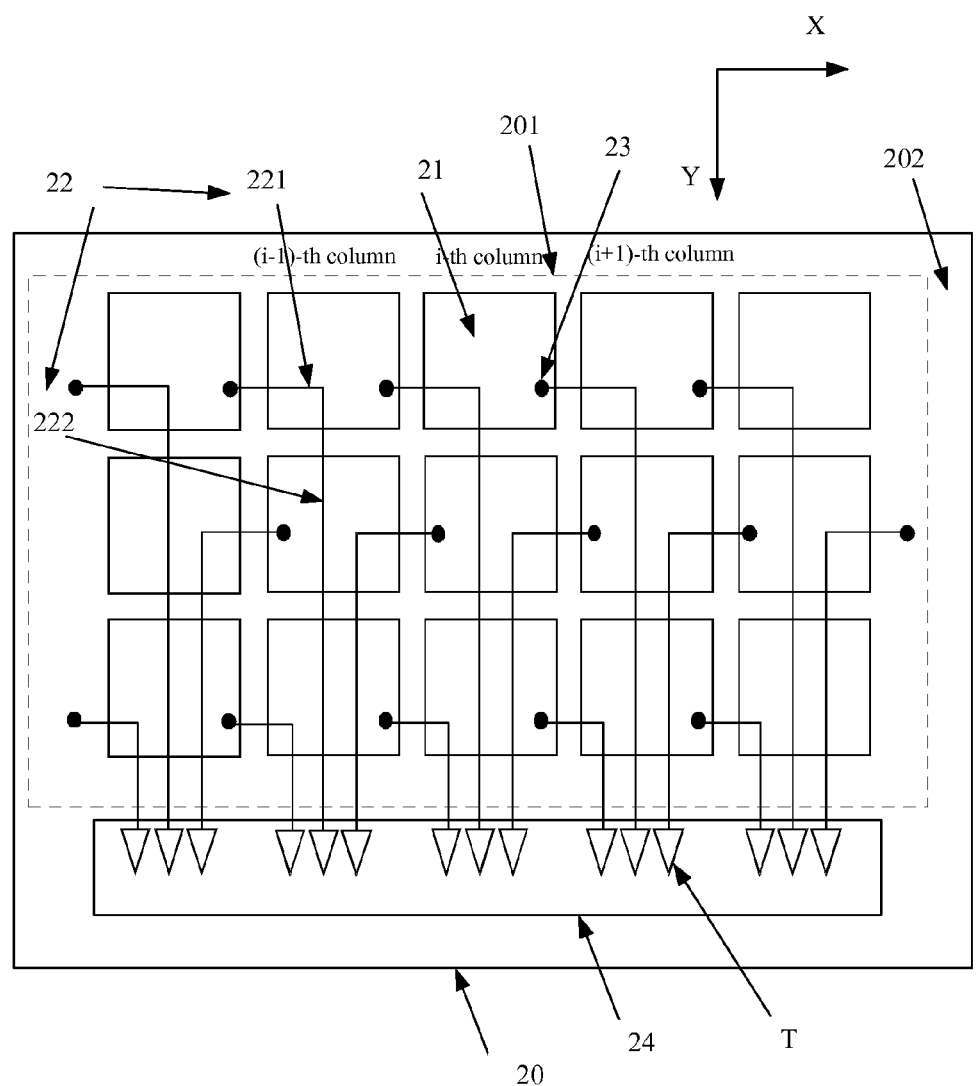
FIG. 2 is a schematic structural diagram of a touch display substrate according to an embodiment of the present disclosure.

A touch display substrate is provided according to an embodiment of the present disclosure, to avoid the vertical crosstalk in the touch display substrate. FIG. 2 is a schematic structural diagram of a touch display substrate according to an embodiment of the present disclosure. The touch display substrate includes: a substrate 20, a common electrode layer and a wire layer, where the common electrode layer and the wire layer are arranged on the same side of the substrate 20.

The common electrode layer and the wire layer are arranged separately, that is, the common electrode layer is arranged opposite to the wire layer in a direction perpendicular to the substrate.

The common electrode layer includes multiple common electrodes 21 which are arranged spaced apart from one another and arranged in an array of M rows×N columns, the common electrodes 21 serve as touch electrodes, where M and N are positive integers.

The wire layer includes multiple wires 22 respectively connected to the common electrodes 21. Each wire 22 includes a first connection portion 221 and a second connection portion 222. An insulation layer is arranged between the wire 22 and the common electrode 21. A wire 22 is electrically connected to a respective common electrode 21 through a via hole 23.

The common electrode 21 is electrically connected to a control circuit 24 with the first connection portion 221 and the second connection portion 222. In a touch time sequence period, the control circuit 24 is configured to perform touch detection on the common electrode 21.

For any one of the wires 22 and a common electrode 21 electrically connected to the wire 22, a first end of the first connection portion 221 is connected to the common electrode 21 and a second end of the first connection portion 221 is connected to the second connection portion 222. The second connection portion 222 is parallel to a column direction Y (e.g. vertical direction) of the array and is not overlapped with common electrodes 21 in the same column as the common electrode 21 electrically connected to the second connection portion 222.

Among M wires 22 corresponding to common electrodes 21 in a same column of the array, second ends of first connection portions of wires electrically connected to common electrodes in odd rows are arranged on one side of the column of common electrodes, and second ends of first connection portions of wires electrically connected to common electrodes in even rows are arranged on the other side of the column of common electrodes. In FIG. 2, second ends of first connection portions of wires 22 electrically connected to common electrodes in odd rows are arranged on the left side of the column of the common electrodes, and second ends of first connection portions of wires 22 electrically connected to common electrodes in even rows are arranged on the right side of the column of the common electrodes.

In one embodiment of the present disclosure, for the array of common electrodes, a row direction X is a direction from a common electrode in a first column to a common electrode in a last column and in the same row. The column direction Y is a direction from a common electrode in a first row to a common electrode in a last row and in the same column.

In one embodiment shown in FIG. 2, the first connection portion 221 is straight line shaped. In this case, the first connection portion 221 may be arranged parallel to the row direction X of the array.

The wires 22 electrically connected to common electrodes in odd rows may be defined as wires of a first type, and the wires 22 electrically connected to common electrodes in even rows may be defined as wires of a second type. In one embodiment of the present disclosure, the first connection portions 221 of wires of one of the first type and the second type extend in the row direction X, and first connection portions 221 of wires of the other one of the first type and the second type extend in a direction reverse to the row direction X. The extending direction of the first connection portion 221 is a direction from the first end of the first connection portion 221 to the second end of the first connection portion 221.

A projection of a second end of a first connection of a wire electrically connected to any one of the common electrodes 21 onto the common electrode layer in a direction perpendicular to the substrate 20 is within a common electrode 21 which is adjacent to the common electrode 21 and in the same row as the common electrode 21. In FIG. 2, a second end of a first connection portion of a wire 22 corresponding to a common electrode 21 in an i-th column and a first row is arranged opposite to a common electrode 21 in an (i+1)-th column and the first row in a direction perpendicular to the substrate 20. A second end of a first connection portion of a wire 22 corresponding to a common electrode 21 in the i-th column and a second row is arranged opposite to a common electrode 21 in an (i−1)-th column and the second row in a direction perpendicular to the substrate 20.

In some embodiments, N, the amount of columns, is a positive integer larger than 2. Among wires 22 connected to common electrodes in the i-th column, second ends of first connection portions 221 of wires of the first type are arranged opposite to the common electrodes in the (i+1)-th column in the direction perpendicular to the substrate 20, and second ends of first connection portions 221 of wires of the second type are arranged opposite to the common electrodes in the (i−1)-th column in the direction perpendicular to the substrate 20, where i is a positive integer in an range from 1 to N.

The substrate 20 includes a display region 201 and a frame region 202, the display region 201 is a region where the common electrodes are arranged, and the frame region 202 is a region on the substrate 20 other than the display region 201. The control circuit 24 is arranged in the frame region 202.

Among wires 22 connected to common electrodes in the first column, second ends of first connection portions 221 of wires of the first type are arranged opposite to the common electrodes 21 in the second column in the direction perpendicular to the substrate 20, and second ends of first connection portions 221 of wires of the second type are arranged opposite to the frame region 202 in the direction perpendicular to the substrate 20.

Among wires 22 connected to common electrodes in an N-th column, second ends of first connection portions 221 of wires of the first type are arranged opposite to the frame region 202 in the direction perpendicular to the substrate 20, and second ends of first connection portions 221 of wires of the second type are arranged opposite to common electrodes in an (N−1)-th column in the direction perpendicular to the substrate 20.

In an embodiment shown in FIG. 2, it is described an example in which the first connection portions 221 of the wires of the first type extend in the row direction X and the first connection portions 221 of the wires of the second type extend in the direction reverse to the row direction X. In another embodiment, the first connection portions 221 of the wires of the first type may extend in the direction reverse to the row direction X and the first connection portions 221 of the wires of the second type may extend in the row direction X.

In some embodiments, the first connection portions 221 of the wires of the first type extend in the direction reverse to the row direction X and the first connection portions 221 of the wires of the second type extend in the row direction X with N being a positive integer larger than 2. Among wires connected to common electrodes in the i-th column, the second ends of the first connection portions of the wires of the first type are arranged opposite to common electrodes in the (i−1)-th in the direction perpendicular to the substrate, and the second ends of the first connection portions of the wires of the second type are arranged opposite to common electrodes in the (i+1)-th column in the direction perpendicular to the substrate, where i is a positive integer in a range from 1 to N.

In some embodiments, the first connection portions 221 of the wires of the first type extend in the direction reverse to the row direction X, the first connection portions 221 of the wires of the second type extend in the row direction with N being a positive integer larger than 2, the substrate also includes a display region and a frame region, and the control circuit is arranged in the frame region. Among wires connected to common electrodes in a first column, second ends of first connection portions of wires of the first type are arranged opposite to the frame region in the direction perpendicular to the substrate and second ends of first connection portions of wires of the second type are arranged opposite to common electrodes in a second column in the direction perpendicular to the substrate. Among wires connected to common electrodes in the N-th column, second ends of first connection portions of wires of the first type are arranged opposite to common electrodes in the (N−1)-th column in the direction perpendicular to the substrate and second ends of first connection portions of wires of the second type are arranged opposite to the frame region in the direction perpendicular to the substrate.

In a touch time sequence period, common electrodes in odd columns and common electrodes in even columns may be driven in a time sharing manner to perform touch detection, in order to perform the touch detection on the above-described touch display substrate. Specifically, all of the common electrodes in the odd columns or all of the common electrodes in the even columns are driven simultaneously to perform the touch detection, and the common electrodes in the odd columns and the common electrodes in the even columns are not driven simultaneously.

In the touch display substrate according to an embodiment of the present disclosure, wires connected to common electrodes in odd rows in the i-th column are arranged opposite to common electrodes adjacent to one side of the i-th column, and wires connected to common electrodes in even row in the i-th column are arranged opposite to common electrodes adjacent to the other side of the i-th column.

In a case that the common electrodes in the odd columns and the common electrodes in the even columns are driven in the time sharing manner, the common electrode in the even columns may be provided with a common voltage signal while the common electrodes in the odd columns are in a touch detection state. In this case, the common electrodes in the odd columns perform the touch detection while the common electrodes in the even columns do not perform the touch detection. Therefore, there is no crosstalk between the wires connected to the common electrodes in the odd columns and the common electrodes in the even columns opposite to the wires. Similarly, the common electrodes in the odd columns may be provided with the common voltage signal while the common electrodes in the even columns are in the touch detection state. In this case, the common electrodes in the odd columns do not perform the touch detection, and there is no crosstalk between the wires connected to the common electrodes in the even columns and the common electrodes in the odd columns opposite to the wires. Regardless of the common electrodes in the odd columns being in the touch detection state or the common electrodes in the even columns being in the touch detection state, since wires connected to common electrodes in touch detection are arranged opposite to common electrodes in an adjacent column not in the touch detection, vertical crosstalk is avoided for the common electrodes being in the touch detection, thereby ensuring the accuracy of the touch detection.

The wires 22 can be electrically connected to the control circuit 24 via touch detection amplifiers T. In the above-described embodiments, the wires 22 are connected to the touch detection amplifiers T in a one-to-one way.

In a case that the common electrodes in the odd columns and the common electrodes in the even columns are driven in the time sharing manner, if touch detection amplifiers are arranged for the common electrodes in a one-to-one way, a half of the touch detection amplifiers are in a resting state in the touch detection. In order to simplify the control circuit and shrink the frame region, one touch detection amplifier may be shared by two common electrodes in adjacent columns in the same row. In this case, one touch detection amplifier is for driving and probing not only the common electrode in the odd column but also the common electrode in the even column, thereby reducing a half of the touch detection amplifiers and simplifying the control circuit.

Figure 3:
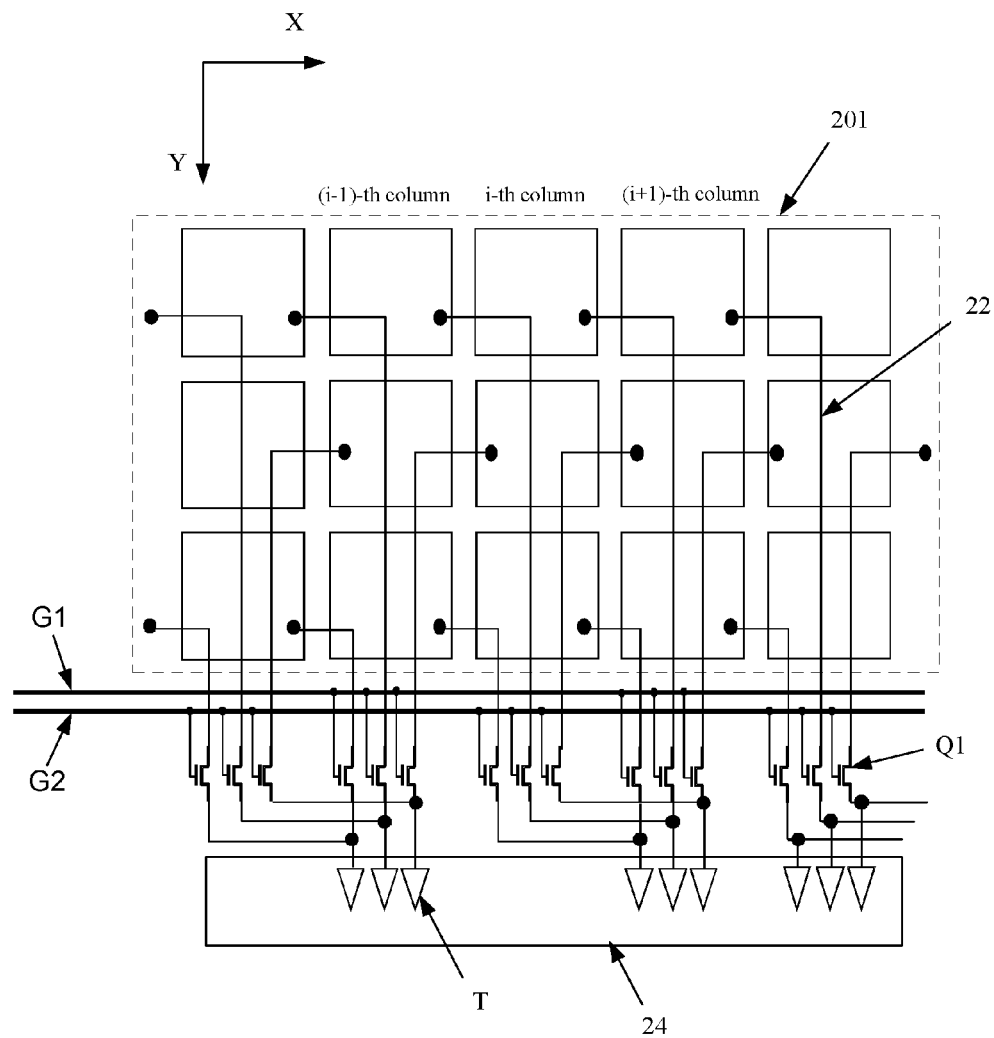
FIG. 3 is a schematic structural diagram of a touch display substrate according to an embodiment of the present disclosure.

FIG. 3 is a schematic structural diagram of a touch display substrate according to an embodiment of the present disclosure. A structure within a display region 201 of the substrate in the embodiment shown in FIG. 3 is the same as that in the embodiment shown in FIG. 2. The embodiment shown in FIG. 3 is different from the embodiment shown in FIG. 2 in that the touch detection substrate shown in FIG. 3 further includes multiple first switch transistors Q1 connected to the wires 22 in a one-to-one way, a first clock signal line G1 and a second clock signal line G2. Second connection portions of wires 22 are connected to the control circuit 24 via the first switch transistors Q1.

The first switch transistor Q1 includes a control end, a first electrode and a second electrode. The first electrode is electrically connected to the second connection portion of the wire 22, and the second electrode is connected to the control circuit 24. The first clock signal line G1, the second clock signal line G2 and the first switch transistor Q1 are arranged in a frame region of the substrate.

Control ends of first switch transistors Q1 connected to wires 22 corresponding to common electrodes in odd columns are connected to the first clock signal line G1, and control ends of first switch transistors Q1 connected to wires 22 corresponding to common electrodes in even columns are connected to the second clock signal line G2.

In the touch display substrate shown in FIG. 3, the common electrodes in the odd columns and the common electrode in the even columns are driven in a time sharing manner, that is to say, the common electrodes in the odd columns and the common electrodes in the even columns do not perform the touch detection simultaneously. All of the common electrodes in the odd columns may be simultaneously controlled to be connected to the control circuit 24 with the first clock signal line G1. All of the common electrodes in the even columns may be simultaneously controlled to be connected to the control circuit 24 with the second clock signal line G2. In this case, the common electrodes in the odd columns and the common electrodes in the even columns are not in the touch detection state simultaneously. Therefore, common electrodes in the same row among common electrodes in two adjacent columns may share one touch detection amplifier T.

The first switch transistor Q1 may be a thin-film transistor which may be prepared in the same process as a thin-film transistor of a pixel unit in the display region. Therefore, no fabrication process is added and the fabrication cost is low.

In order to drive a display function and a touch function of the touch display substrate in the time sharing manner, the touch display substrate further includes multiple second switch transistors corresponding to the first switch transistors in a one-to-one way. The second switch transistor includes a control end, a first electrode and a second electrode. A switching voltage of the second switch transistor is different from a switching voltage of the first switch transistor.

For a second switch transistor and the corresponding first switch transistor, a first electrode of the second switch transistor is connected to a first electrode of the first switch transistor, that is, the first electrode of the first switch transistor and the first electrode of the second switch transistor are connected to the same common electrode. A second electrode of the second switch transistor is used to input a common electrode voltage signal. A control end of the second switch transistor is connected to a control end of the first switch transistor, that is, the control end of the second switch transistor and the control end of the first switch transistor are connected to the same clock signal line. The first switch transistor is an N-channel Metal Oxide Semiconductor (NMOS) and the second switch transistor is a P-channel Metal Oxide Semiconductor (PMOS); alternatively, the first switch transistor is a PMOS and the second switch transistor is an NMOS.

Figure 4:
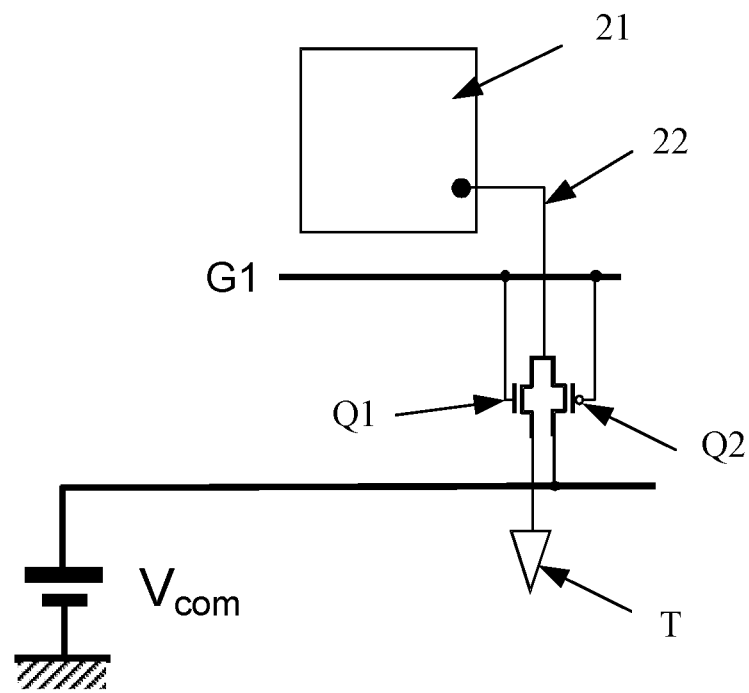
FIG. 4 is a schematic structural diagram of a touch display substrate according to an embodiment of the present disclosure.

FIG. 4 is a schematic structural diagram of a touch display substrate according to an embodiment of the present disclosure. A circuit connection relationship between a first switch transistor Q1 and a second switch transistor Q2 which are connected to any one of common electrodes 21 in odd columns in the touch display substrate is shown in FIG. 4. In FIG. 4, the first switch transistor Q1 is an NMOS and the second switch transistor Q2 is a PMOS. Both a first electrode of the first switch transistor Q1 and a first electrode of the second switch transistor Q2 are connected to the same common electrode 21. Both a control end of the first switch transistor Q1 and a control end of the second switch transistor Q2 are connected to a first clock signal line G1. A second electrode of the first switch transistor Q1 is connected to a touch detection amplifier T, and a second electrode of the second switch transistor Q2 is connected to a common voltage signal $V_{com}$.

A touch function and a display function may be driven in a time sharing manner with the first switch transistor and the second switch transistor. In a display time sequence period, first switch transistors are turned off and second switch transistors are turned on with the first clock signal line and the second clock signal line, where the first switch transistors and the second switch transistors are connected to the common electrodes. In this way, a common voltage signal may be input to the common electrodes via the second switch transistors, to drive display.

In a touch time sequence period, first switch transistors corresponding to common electrodes in the odd columns and first switch transistors corresponding to common electrodes in the even columns are controlled to be turned on in a time sharing manner, and a second switch transistor is controlled to be turned off while a first switch transistor connected to the same common electrode as the second switch transistor is turned on, or the second switch transistor is controlled to be turned on while the first switch transistor is turned off, with the first clock signal line and the second clock signal line. In this way, the common electrodes in the odd columns and the common electrodes in the even columns perform the touch detection in the time sharing manner.

In the touch detection, in a case that the common electrodes in the odd columns and the common electrodes in the even columns are driven in the time sharing manner, a period of time for touch driving and a period of time for touch detection may be shorten, thereby affecting a uniformity and a signal to noise ratio of a touch detection signal.

In order to ensure that a touch detection signal in the touch detection has a good uniformity and a good signal to noise ratio, among M wires corresponding to common electrodes in the same column, first connection portions of the wires are fold line shaped and straight line shaped which are arranged alternately in a column direction, and an included angle of 90 degrees is formed in the first connection portion of fold line shaped. That is to say, for common electrodes in the same column, first connection portions of wires corresponding to the common electrodes in the odd rows are fold line shaped and first connection portions of wires corresponding to the common electrodes in the even rows are straight line shaped; alternatively, the first connection portions of the wires corresponding to the common electrodes in the odd rows are straight line shaped and the first connection portions of the wires corresponding to the common electrodes in the even rows are fold line shaped.

Since the first connection portions of the wires corresponding to the common electrodes in the odd rows or the common electrodes in the even rows are arranged to be fold line shaped, for any one of common electrodes in a j-th row, there are M wires of the first type passing through in the column direction a region which corresponds to the common electrode in a direction perpendicular to the substrate, and M wires of the second type passing through in the column direction a region which corresponds to the common electrode in the direction perpendicular to the substrate, where j is a positive integer in a range from 1 to M. In this case, each wire is connected to a control circuit via a separate touch detection amplifier. In touch detection, the wire of the first type and the wire of the second type perform the touch detection simultaneously, and a phase difference between a touch detection signal for the wire of the first type and a touch detection signal for the wire of the second type is 180 degrees. That is, the common electrode in the odd row and the common electrode in the even row perform the touch detection simultaneously, and a phase difference between a touch detection signal input via the wire corresponding to the common electrode in the odd row and a touch detection signal input via the wire corresponding to the common electrode in the even row is 180 degrees.

Figure 5:
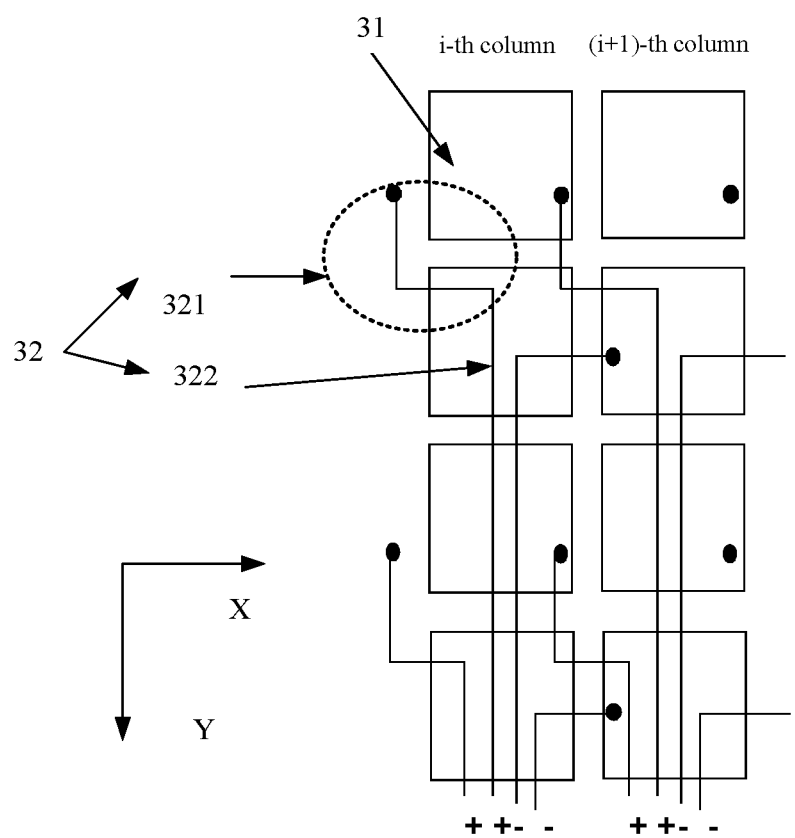
FIG. 5 is a schematic structural diagram of a touch display substrate according to an embodiment of the present disclosure.

FIG. 5 is a schematic structural diagram of a touch display substrate according to an embodiment of the present disclosure. In the touch display substrate shown in FIG. 5, first connection portions 321 of wires 32 corresponding to common electrodes 31 in odd rows are fold line shaped, and second connection portions 322 of the wires 32 corresponding to the common electrodes 31 in the odd rows are straight line shaped which are parallel to a column direction Y. First connection portions 321 of the wires 32 corresponding to common electrodes 31 in even rows are straight line shaped which are parallel to a row direction X and second connection portions 322 of the wires 32 corresponding to the common electrodes 31 in the even rows are straight line shaped which are parallel to the column direction Y.

Among M wires corresponding to common electrodes 31 in the same column, second ends of the first connection portions 321 of the wires 32 corresponding to the common electrodes 31 in the odd rows and second ends of the first connection portions 321 of the wires 32 corresponding to the common electrodes 31 in the even rows are respectively arranged on two sides of the column of common electrodes. In this way, the second connection portions 322 of the wires 32 corresponding to the common electrodes 31 in the odd rows and the second connection portions 322 of the wires 32 corresponding to the common electrodes 31 in the even rows are respectively arranged on two sides of the column of the common electrodes 31. The second connection portions 322 are parallel to the column direction Y.

A common electrode with a first connection portion of fold line shaped is defined as a first common electrode. A projection of a second end of the first connection portion connected to the first common electrode onto the common electrode layer in a direction perpendicular to the substrate is within a third common electrode. The third common electrode is arranged in a row adjacent to the row of the first common electrode and in a column next to the column of the first common electrode. As shown in FIG. 5, a common electrode in an i-th column and first row is a first common electrode, and a projection of a second end of a wire corresponding to the common electrode onto the common electrode layer is in a common electrode in an (i+1)-th column and second row.

Since the first connection portions 321 of the wires 32 corresponding to the common electrodes in the odd rows or the common electrodes in the even row are arranged to be fold line shaped, for any one of common electrodes 31 in a j-th row, there are m wires of the first type passing through in the column direction a region which corresponds to the common electrode 31 in a direction perpendicular to the substrate, and m wires of the second type passing through in the column direction a region which corresponds to the common electrode 31 in the direction perpendicular to the substrate, where j is a positive integer in a range from 1 to M, with M being a positive integer. That is to say, m wires 32 corresponding to the common electrodes 31 in the odd rows and m wires 32 corresponding to the common electrodes 31 in the even rows pass through any one of common electrodes 31 in a second row to an M-th row.

In a case that a phase difference between a touch detection signal for the wire 32 corresponding to the common electrode 31 in the odd row and a touch detection signal for the wire 32 corresponding to the common electrode 31 in the even row is set to be 180 degrees, that is, a touch detection signal for the wire 32 corresponding to the common electrode 31 in the odd row and a touch detection signal for the wire 32 corresponding to the common electrode 31 in the even row have the same amplitude and opposite polarities. In this way, all of the common electrodes 31 may be driven simultaneously. As shown in FIG. 5, the number of wires with '+' (e.g. positive) touch detection signals is the same as the number of wires with '−' (e.g. negative) touch detection signals for a column of common electrodes 31. In this case, according to a principle of reverse pulses canceling each other out, interference noises on the common electrodes generated by the wires 32 corresponding to the common electrodes 31 in the odd rows and the wires 32 corresponding to the common electrodes 31 in the even rows may cancel each other out, thereby avoiding crosstalk in touch detection and ensuring the accuracy of the touch detection.

In the touch display substrate according to the embodiment of the present disclosure, among wires corresponding to common electrodes in the same column, the wires corresponding to the common electrodes in the odd rows and the wires corresponding to the common electrodes in the even rows are arranged respectively on left side and right side of the column of the common electrodes, thereby dispersing interference on a column in the row direction X and blurring bright-dark stripe boundaries generated due to the interference in the column direction Y. Moreover, with a driving method according to an embodiment of the present disclosure, the boundaries between bright-dark stripes in the column direction Y are weakened greatly and a good display effect is ensured.

Figure 6:
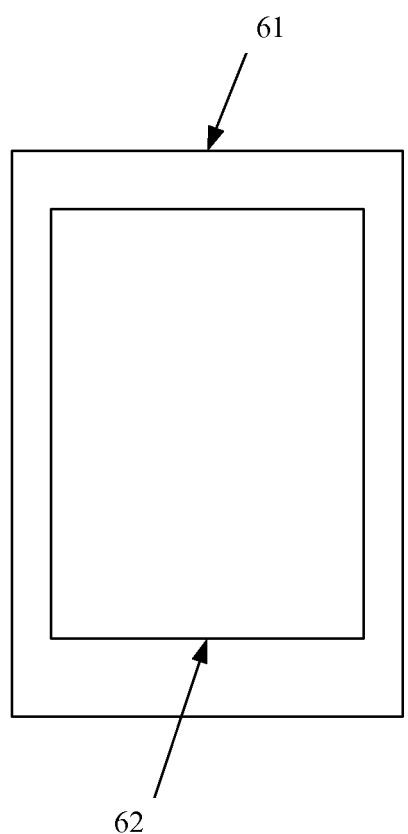
FIG. 6 is a schematic structural diagram of an electronic device according to an embodiment of the present disclosure.

An electronic device is further provided according to an embodiment of the present disclosure, as shown in FIG. 6. FIG. 6 is a schematic structural diagram of an electronic device according to the embodiment of the present disclosure. The electronic device 61 includes a touch display substrate 62 which is the touch display substrate according to any one of the above-described embodiments.

Since the electronic device has the touch display substrate according to the above-described embodiments, the accuracy of touch detection is high.

A driving method is further provided according to an embodiment of the present disclosure, to drive the touch display substrate according to any one of the above-described embodiments. The driving method includes multiple display time sequence periods and touch time sequence periods which are alternate. In the touch time sequence period, common electrode in odd columns and common electrodes in even columns are driven in a time sharing manner to perform touch detection.

In the touch display substrate according to the embodiments of the present disclosure, the first connection portions and the second connection portions of wires are arranged. Therefore, in a case that the common electrodes in the odd columns and the common electrodes in the even columns perform the touch detection in a time sharing manner, the second connection portions of the wires corresponding to the column of the common electrodes in the touch detection are opposite to common electrodes in a column adjacent to the column, thereby avoiding vertical crosstalk and ensuring the accuracy of the touch detection.

The method for driving the common electrodes in the odd columns and the common electrodes in the even columns includes: inputting a driving voltage to the common electrodes in the odd columns rather than the common electrodes in the even columns; or inputting a driving voltage to the common electrodes in the even columns rather than the common electrodes in the odd columns. The driving voltage controls the respective common electrodes to perform touch detection. A common voltage signal may be input to the common electrodes to which the driving voltage is not input.

In a case that the driving method is applied to the touch display substrate as shown in FIG. 3, the touch display substrate includes multiple first switch transistors connected to wires corresponding to common electrodes in a one-to-one way, a first clock signal line and a second clock signal line. The first switch transistor has a control end, a first electrode and a second electrode. The wire is connected to a control circuit via the first switch transistor. The first electrode is connected to the wire and the second electrode is connected to the control circuit. Control ends of first switch transistors corresponding to common electrodes in odd columns are connected to the first clock signal line and controls end of first switch transistors corresponding to common electrodes in even columns are connected to the second clock signal line. In this case, in a touch time sequence period, the driving method includes: turning on the first switch transistors electrically connected to the common electrodes in the odd columns and turning off the first switch transistors electrically connected to the common electrodes in the even columns to drive only the common electrodes in the odd columns to perform touch detection; or turning on the first switch transistors electrically connected to the common electrodes in the even columns and turning off the first switch transistors electrically connected to the common electrodes in the odd columns to drive only the common electrodes in the even columns to perform touch detection.

The common electrodes in the odd columns and the common electrodes in the even columns perform the touch detection in a time sharing manner by controlling a switching state of the first switch transistors. Only the common electrodes in the odd columns are driven to perform touch detection by turning on the first switch transistors electrically connected to the common electrodes in the odd columns and turning off the first switch transistors electrically connected to the common electrode in the even columns. Alternatively, only the common electrodes in the even columns are driven to perform touch detection by turning on the first switch transistors electrically connected to the common electrodes in the even columns and turning off the first switch transistors electrically connected to the common electrodes in the odd columns.

The first switch transistors electrically connected to the common electrodes in the odd columns and the first switch transistors electrically connected to the common electrodes in the even columns may be turned on in a time sharing manner by providing different signals to the first clock signal line and the second clock signal line, to drive the common electrodes in the odd columns and the common electrodes in the even columns in the time sharing manner.

A first turn-on voltage is provided to the first clock signal line to turn on first switch transistors connected to wires corresponding to all of the common electrodes in the odd columns to drive all of the common electrodes in the odd columns to perform touch detection, and a turn-off voltage is provided to the second clock signal line to turn off first switch transistors connected to wires corresponding to all of the common electrodes in the even columns to make all of the common electrodes in the even columns not perform touch detection. Alternatively, the first turn-on voltage is provided to the second clock signal line to turn on the first switch transistors connected to the wires corresponding to all of the common electrodes in the even columns to drive all of the common electrodes in the even columns to perform touch detection, and the turn-off voltage is provided to the first clock signal line to turn off the first switch transistors connected to the wires corresponding to all of the common electrodes in the odd columns to make all of the common electrodes in the odd columns not perform touch detection.

It should be noted that, the common electrodes in the odd columns or the common electrodes in the even columns may be driven to perform the touch detection firstly, and the driving order is not limited herein.

In a case that the driving method is applied to the touch display substrate shown in FIG. 4, the touch display substrate includes: multiple second switch transistors corresponding to the first switch transistors in a one-to-one way. The second switch transistor includes a control end, a first electrode and a second electrode. For a second switch transistor and the corresponding first switch transistor, a first electrode of the second switch transistor is connected to a first electrode of the first switch transistor, a second electrode of the second switch transistor is used to input a common voltage signal, a control end of the second switch transistor is connected to a control end of the first switch transistor, and a switching voltage of the second switch transistor is different from a switching voltage of the first switch transistor.

The method for driving the common electrodes in the odd columns and the common electrodes in the even columns includes: in a touch time sequence period, inputting a driving voltage to the common electrodes in the odd columns rather than the common electrodes in the even columns; or inputting a driving voltage to the common electrodes in the even columns rather than the common electrodes in the odd columns. In a display time sequence period, inputting a common voltage signal to all of the common electrodes.

Display and touch detection may be driven in a time sharing manner by controlling the first switch transistors and the second switch transistors. In this case, the process for driving the common electrodes in the odd columns and the common electrodes in the even column includes: in a touch time sequence period, turning on first switch transistors electrically connected to the common electrodes in the odd columns and turning off first switch transistors electrically connected to the common electrodes in the even columns to drive only the common electrodes in the odd columns to perform touch detection; or turning on the first switch transistors electrically connected to the common electrodes in the even columns and turning off the first switch transistors electrically connected to the common electrodes in the odd columns to drive only the common electrodes in the even columns to perform touch detection. For a first switch transistor and a second switch transistor connected to the same common electrode, the first switch transistor is turned on while the second switch transistor is turned off, or the first switch transistor is turned off while the second switch transistor is turned on. In this way, a common voltage signal is provided to a common electrode in the touch detection via the second switch transistor. In the display time sequence period, all of the first switch transistors are turned off and all of the second switch transistors are turned on, to provide the common voltage signal to all of the common electrodes to drive display.

Since the switching voltage of the first switch transistor is different from the switching voltage of the second switch transistor, conductive states of the first switch transistors and the second switch transistors which correspond to all of the common electrodes in the odd columns may be controlled with the first clock signal line simultaneously, and conductive states of the first switch transistors and the second switch transistors which correspond to all of the common electrodes in the even columns may be controlled with the second clock signal line simultaneously, thereby driving touch and display in a time sharing manner. In the touch time sequence period, the common electrodes in the odd columns and the common electrodes in the even columns are driven in the time sharing manner.

In this case, the process for driving the common electrodes in the odd columns and the common electrodes in the even columns includes: providing, in a touch time sequence period, the first turn-on voltage to the first clock signal line and providing the turn-off voltage to the second clock signal line, or providing the turn-off voltage to the first clock signal line and providing the first turn-on voltage to the second clock signal line; where a control ends of the first switch transistors are turned on if the first turn-on voltage is input to the first switch transistors or are turned off if the turn-off voltage is input to the first switch transistors, and control ends of the second switch transistors are turned off if the first turn-on voltage is input to the second switch transistors or are turned on if the turn-off voltage is input to the second switch transistors; in a display time sequence period, providing a second turn-on voltage to the first clock signal line and the second clock signal line; where the control ends of the first switch transistors are turned off if the second turn-on voltage is input to the second switch transistors, and the control ends of the second switch transistors are turned on if the second turn-on voltage is input to the second switch transistors, and the second turn-on voltage may be the switching voltage.

The driving method according to the embodiment is for driving the touch detection and display of the touch display substrate. The display and touch detection may be controlled in the time sharing manner. In the touch time sequence period, the common electrodes in the odd columns and the common electrodes in the even columns are controlled in the time sharing manner, thereby avoiding vertical crosstalk and improving the accuracy of the touch detection.

Another driving method is provided according to an embodiment of the present disclosure, which is applied to the touch display substrate in which one common electrode is connected to one touch detection amplifier according to the above-described embodiments. The driving method includes multiple display time sequence periods and multiple touch time sequence periods which are alternate. In the touch time sequence period, all of the common electrodes are driven simultaneously to perform touch detection. A phase difference between a touch detection signal for the common electrodes in the odd rows and a touch detection signal for the common electrodes in the even rows is 180 degrees.

In the driving method, the common electrodes in the odd rows and the common electrodes in the even rows are driven simultaneously. The crosstalk between common electrodes and wires corresponding to the common electrodes is canceled out according to a principle that noises in touch detection signals with the same amplitudes and reverse polarities cancel each other out, thereby improving the accuracy of the touch detection. Moreover, since it is unnecessary to drive the common electrodes in the odd columns and the common electrodes in the even columns in the time sharing manner, the period of time for the driving and detection is long in a same detection period, thereby obtaining a touch detection signal with a good uniformity and a good signal to noise ratio.

The method may be applied to the touch display substrate according to the embodiment shown in FIG. 5. Among wires passing through common electrodes in the second row to the (M−1)-th row, the number of wires corresponding to the common electrodes in the odd columns may be equal to the number of wires corresponding to the common electrodes in the even columns by arranging first connection portions of the wires to be fold line shaped. In this case, the number of wires with '+' (e.g. positive) touch detection signals is equal to the number of wires with '−' (e.g. negative) touch detection signals, thereby ensuring a good noise canceling effect.

It should be noted that, the embodiments of driving method according to the present disclosure is based on the above-described embodiments of touch display substrate, hence, the same or similar parts between the embodiments of the touch display substrate and the embodiments of the driving method may be described complementally to each other.

With the above descriptions of the disclosed embodiments, the skilled in the art may practice or use the present disclosure. Various modifications to the embodiments are apparent for the skilled in the art. The general principle suggested herein can be implemented in other embodiments without departing from the spirit or scope of the disclosure. Therefore, the present disclosure should not be limited to the embodiments disclosed herein, but has the widest scope that is conformity with the principle and the novel features disclosed herein.

The invention claimed is:

1. A touch display substrate, comprising:
a substrate, and a common electrode layer, and a wire layer, wherein the common electrode layer and the wire layer are arranged on a same side of the substrate,
wherein the common electrode layer and the wire layer are disposed separately without overlapping;
wherein the common electrode layer comprises a plurality of common electrodes arranged in an array of M rows×N columns, and the common electrodes serve as touch electrodes, wherein M and N are positive integers;
wherein the wire layer comprises a plurality of wires each electrically connected to one of the plurality of common electrodes respectively, each of the plurality of wires comprises a first connection portion and a second connection portion, the plurality of common electrodes each is electrically connected to a control circuit with the first connection portion and the second connection portion, a first end of the first connection portion is connected to one of the plurality of common electrodes and a second end of the first connection portion is connected to a first end of the second connection portion; among M wires corresponding to common electrodes in a same column, second ends of first connection portions of wires electrically connected to common electrodes in odd rows are arranged on one side of the column of common electrodes and second ends of first connection portions of wires electrically connected to common electrodes in even rows are arranged on the other side of the column of common electrodes; wherein the second connection portion is parallel to a column direction of the array; wherein the second connection portion is not overlapped with common electrodes in a same column as the common electrode electrically connected to the second connection portion;

wherein the touch display substrate comprises a first clock signal line, a second clock signal line and a first switch transistor connected to one of the plurality of wires;

wherein the second connection portion said wire is connected to the control circuit via the first switch transistor;

wherein the first switch transistor comprises a control end, a first electrode and a second electrode, the first electrode is electrically connected to the second connection portion of the wire and the second electrode is electrically connected to the control circuit; and wherein the control end of the first switch transistor electrically connected to one associated common electrode in odd column is connected to the first clock signal line, and the control end of first switch transistor electrically connected to one associated common electrode in even column is connected to the second clock signal line;

wherein a second switch transistor is associated with the first switch transistor;

wherein the second switch transistor comprises a control end, a first electrode and a second electrode; wherein a switching voltage of the second switch transistor is different from a switching voltage of the associated first switch transistor; and wherein for the second switch transistor and the associated first switch transistor, the first electrode of the second switch transistor is connected to the first electrode of the associated first switch transistor, the second electrode of said second switch transistor inputs a common voltage signal, and the control end of the second switch transistor is connected to the control end of the associated first switch transistor.

2. The touch display substrate according to claim 1, wherein the first connection portion is straight.

3. The touch display substrate according to claim 2, wherein the first connection portion is parallel to a row direction of the array.

4. The touch display substrate according to claim 3, wherein a projection of a second end of a first connection portion of a wire electrically connected to any one of the plurality of common electrodes onto the common electrode layer in a direction perpendicular to the substrate is within a common electrode which is in a same row as and is adjacent to the common electrode.

5. The touch display substrate according to claim 1, wherein
the first switch transistor and the second switch transistor are metal oxide semiconductor transistors having opposite polarities.

6. The touch display substrate according to claim 1, wherein first connection portions of the M wires corresponding to the common electrodes in the same column are folding and straight which are arranged alternately in the column direction of the array, and an included angle of 90 degrees is formed in each of folding first connection portions.

7. The touch display substrate according to claim 6, wherein a common electrode corresponding to a folding first connection portion is specified as a first common electrode; wherein a projection of a second end of the first connection portion corresponding to the first common electrode onto the common electrode layer in a direction perpendicular to the substrate is within a third common electrode, and wherein the third common electrode is arranged in a row adjacent to the row of the first common electrode and is arranged in a column next to the column of the first common electrode.

8. The touch display substrate according to claim 6, wherein a phase difference between a touch detection signal input via a wire corresponding to a common electrode in an odd row and a touch detection signal input via a wire corresponding to a common electrode in an even row is 180 degrees.

9. A driving method for driving the touch display substrate according to claim 1, comprising: in a touch time sequence period, driving common electrodes in odd and even columns to perform touch detection in a time-sharing manner.

10. The driving method according to claim 9, wherein the process of driving common electrodes in odd and even columns comprises:
inputting a driving voltage to the common electrodes in the odd columns only; or
inputting a driving voltage to the common electrodes in the even columns only.

11. The driving method according to claim 10, further comprising:
turning on the first switch transistor electrically connected to the associated common electrode in the odd column and turning off the first switch transistor electrically connected to the associated common electrode in the even column, to drive only the common electrodes in the odd columns to perform touch detection; or
turning on the first switch transistor electrically connected to the associated common electrode in the even column and turning off the first switch transistor electrically connected to the associated common electrode in the odd column, to drive only the common electrodes in the even columns to perform touch detection.

12. The driving method according to claim 11, wherein the process of turning on the first switch transistor electrically connected to the associated common electrode in the odd column and turning off the first switch transistor electrically connected to the associated common electrode in the even column comprises:
providing a first turn-on voltage to the first clock signal line to turn on the first switch transistor electrically connected to the associated common electrode in the odd column; and
providing a turn-off voltage to the second clock signal line to turn off the first switch transistor electrically connected to associated the common electrode in the even column.

13. The driving method according to claim 12, wherein the process of turning on the first switch transistor electrically connected to the common electrode in the associated even column and turning off the first switch transistor electrically connected to the associated common electrode in the odd column comprises:
providing the first turn-on voltage to the second clock signal line to turn on the first switch transistor electrically connected to the associated common electrode in the even column; and
providing the turn-off voltage to the first clock signal line to turn off the first switch transistor electrically connected to the associated common electrode in the odd column.

14. The driving method according to claim 13,
wherein the process of driving common electrodes in odd and even columns comprises:
in the touch time sequence period, inputting a driving voltage to the common electrodes in the odd columns only; or inputting a driving voltage to the common electrodes in the even columns only; and in a display time sequence period, inputting a common voltage signal to all of the plurality of common electrodes.

15. The driving method according to claim 14, wherein the process of driving common electrodes in odd and even columns comprises:

in the touch time sequence period, turning on the first switch transistor electrically connected to the associated common electrode in the odd column and turning off the first switch transistor electrically connected to the associated common electrode in the even column, to drive only the common electrodes in the odd columns to perform touch detection; or turning on the first switch transistor electrically connected to the associated common electrode in the even column and turning off the first switch transistor electrically connected to the associated common electrode in the odd column, to drive only the common electrodes in the even columns to perform touch detection; wherein for the first switch transistor and the associated second switch transistor, the first switch transistor is turned on while the second switch transistor is turned off, or the first switch transistor is turned off while the second switch transistor is turned on; and in the display time sequence period, turning off the first switch transistor, turning on the second switch transistor to provide the common voltage signal to the associated common electrode, to drive display.

16. The driving method according to claim 15, wherein the process of driving common electrodes in odd and even columns comprises:

in the touch time sequence period, providing the first turn-on voltage to the first clock signal line and providing the turn-off voltage to the second clock signal line; or providing the turn-off voltage to the first clock signal line and providing the first turn-on voltage to the second clock signal line; wherein the control end of the first switch transistor is turned on if the first turn-on voltage is input to the first switch transistor or is turned off if the turn-off voltage is input to the first switch transistor, and the control end of the second switch transistor is turned off if the first turn-on voltage is input to the second switch transistor or is turned on if the turn-off voltage is input to the second switch transistor; and in the display time sequence period, providing a second turn-on voltage to the first clock signal line and the second clock signal line; wherein the control end of the first switch transistor is turned off if the second turn-on voltage is input to the first switch transistor and the control end of the second switch transistor is turned on if the second turn-on voltage is input to the second switch transistor.

17. An electronic device, comprising a touch display substrate, wherein the touch display substrate comprises: a substrate, a common electrode layer, and a wire layer, wherein the common electrode layer and the wire layer are arranged on a same side of the substrate, wherein the common electrode layer and the wire layer are disposed separately without overlapping;

wherein the common electrode layer comprises a plurality of common electrodes arranged in an array of M rows by N columns, and wherein the common electrodes serve as touch electrodes, wherein M and N are positive integers;

wherein the wire layer comprises a plurality of wires each electrically connected to one of the plurality of common electrodes respectively, each of the plurality of wires comprises a first connection portion and a second connection portion, the plurality of common electrodes each is electrically connected to a control circuit with the first connection portion and the second connection portion, a first end of the first connection portion is connected to one of the plurality of common electrodes and a second end of the first connection portion is connected to a first end of the second connection portion; among M wires corresponding to common electrodes in a same column, second ends of first connection portions of wires electrically connected to common electrodes in odd rows are arranged on one side of the column of common electrodes and second ends of first connection portions of wires electrically connected to common electrodes in even rows are arranged on the other side of the column of common electrodes; wherein the second connection portion is parallel to a column direction of the array, wherein the second connection portion is not overlapped with common electrodes in a same column as the common electrode electrically connected to the second connection portion;

wherein the touch display substrate comprises a first clock signal line, a second clock signal line and a first switch transistor are connected to one of the plurality of wires;

wherein the second connection portion of said wire is connected to the control circuit via the first switch transistor;

wherein the first switch transistor comprises a control end, a first electrode and a second electrode, the first electrode is electrically connected to the second connection portion of the wire and the second electrode is electrically connected to the control circuit; and wherein the control end of first switch transistor electrically connected to one associated common electrode in odd column is connected to the first clock signal line, and the control end of first switch transistor electrically connected to one associated common electrode in even column is connected to the second clock signal line;

wherein a second switch transistor is associated with the first switch transistor; wherein the second switch transistor comprises a control end, a first electrode and a second electrode; wherein a switching voltage of the second switch transistor is different from a switching voltage of the associated first switch transistor; for the second switch transistor and the associated first switch transistor, the first electrode of the second switch transistor is connected to the first electrode of the associated first switch transistor, the second electrode of said second switch transistor inputs a common voltage signal, and the control end of the second switch transistor is connected to the control end of the associated first switch transistor.

* * * * *